US009197075B2

(12) United States Patent
Jeansonne et al.

(10) Patent No.: US 9,197,075 B2
(45) Date of Patent: Nov. 24, 2015

(54) CHARGING PORT BASED ON POWER STATE SIGNAL

(75) Inventors: Jeffrey Kevin Jeansonne, Houston, TX (US); Thomas P. Sawyers, Hempstead, TX (US); Walter G. Fry, Houston, TX (US); Rahul V. Lakdawala, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

(21) Appl. No.: 13/819,333

(22) PCT Filed: Sep. 2, 2010

(86) PCT No.: PCT/US2010/047760
§ 371 (c)(1),
(2), (4) Date: Feb. 26, 2013

(87) PCT Pub. No.: WO2012/030348
PCT Pub. Date: Mar. 8, 2012

(65) Prior Publication Data
US 2013/0154551 A1    Jun. 20, 2013

(51) Int. Cl.
*H02J 7/00*    (2006.01)
*G06F 1/26*    (2006.01)

(52) U.S. Cl.
CPC . *H02J 7/00* (2013.01); *G06F 1/266* (2013.01); *G06F 2213/0038* (2013.01)

(58) Field of Classification Search
CPC .............. G06F 13/126; G06F 13/4282; H02J 2007/0062; H02J 7/0052; H02J 7/007; H02J 7/0042; H02J 7/0004; H02J 7/0029; H02J 7/00

USPC .................................. 320/107, 137; 713/300
See application file for complete search history.

(56) References Cited

U.S. PATENT DOCUMENTS

| 6,523,122 B1* | 2/2003 | Moon | 713/300 |
| 6,697,953 B1* | 2/2004 | Collins | 713/320 |
| 7,518,343 B2 | 4/2009 | Veselic et al. | |
| 7,624,202 B2 | 11/2009 | Monks et al. | |
| 7,675,571 B2 | 3/2010 | Cheng et al. | |
| 8,386,814 B2* | 2/2013 | Tom et al. | 713/300 |
| 8,736,227 B2* | 5/2014 | Chadbourne et al. | 320/107 |
| 2006/0085653 A1 | 4/2006 | Bollinger et al. | |
| 2006/0095641 A1 | 5/2006 | Pandit et al. | |
| 2007/0050297 A1* | 3/2007 | Xu et al. | 705/52 |

(Continued)

FOREIGN PATENT DOCUMENTS

| CN | 101243374 | 8/2008 |
| CN | 101573676 | 11/2009 |
| CN | 1564104 | 1/2015 |

OTHER PUBLICATIONS

Lai et al.; "Battery Charging Specification", USB Implemeters Forum, Inc., <URL:http://etools.info/project/documents/18001_19000/18509/batt_charging_1_1_final.pdf>, Apr. 15, 2009.

(Continued)

*Primary Examiner* — Arun Williams
(74) *Attorney, Agent, or Firm* — HP Legal Department

(57) ABSTRACT

A computing system including a port to provide power to a portable device. The power state of the computing system is determined and the type of charging port to provide can be based on the power state of the computing system.

18 Claims, 7 Drawing Sheets

(56) References Cited

U.S. PATENT DOCUMENTS

| | | |
|---|---|---|
| 2008/0042616 A1 | 2/2008 | Monks et al. |
| 2009/0144575 A1* | 6/2009 | Tevanian, Jr. .................. 713/324 |
| 2010/0070659 A1 | 3/2010 | Ma et al. |
| 2010/0090644 A1* | 4/2010 | Nokkonen et al. ............ 320/107 |
| 2010/0219790 A1* | 9/2010 | Chadbourne et al. ......... 320/107 |
| 2011/0016334 A1* | 1/2011 | Tom et al. ..................... 713/300 |
| 2011/0057604 A1* | 3/2011 | Capella ......................... 320/107 |
| 2011/0266997 A1* | 11/2011 | Krancher et al. ............. 320/107 |
| 2012/0210146 A1* | 8/2012 | Lai et al. ....................... 713/310 |

OTHER PUBLICATIONS

International Searching Authority, International Search Report and Written Opinion, Appln No. PCT/US2010/047760, date of mailing May 13, 2011, pp. 9.

\* cited by examiner

| First Signal 590 | Second Signal 595 | Third Signal 585 | Resulting CP Mode |
|---|---|---|---|
| 0 | 0 | 0 | OFF |
| 0 | 0 | 1 | DCP |
| 0 | 1 | 0 | SDP |
| 0 | 1 | 1 | DCP |
| 1 | 1 | 0 | SDP |
| 1 | 1 | 1 | CDP |

FIG. 6

CHARGING PORT BASED ON POWER STATE SIGNAL

BACKGROUND

A portable electronic device may operate on rechargeable batteries. The batteries of the device may be charged by attaching the device to an external power supply. The external power supply may be a direct current (DC) power source.

BRIEF DESCRIPTION OF THE DRAWINGS

Some embodiments of the invention are described with respect to the following figures:

FIG. 6 is a table of logic values according to an example embodiment; and

DETAILED DESCRIPTION

Figure 1:
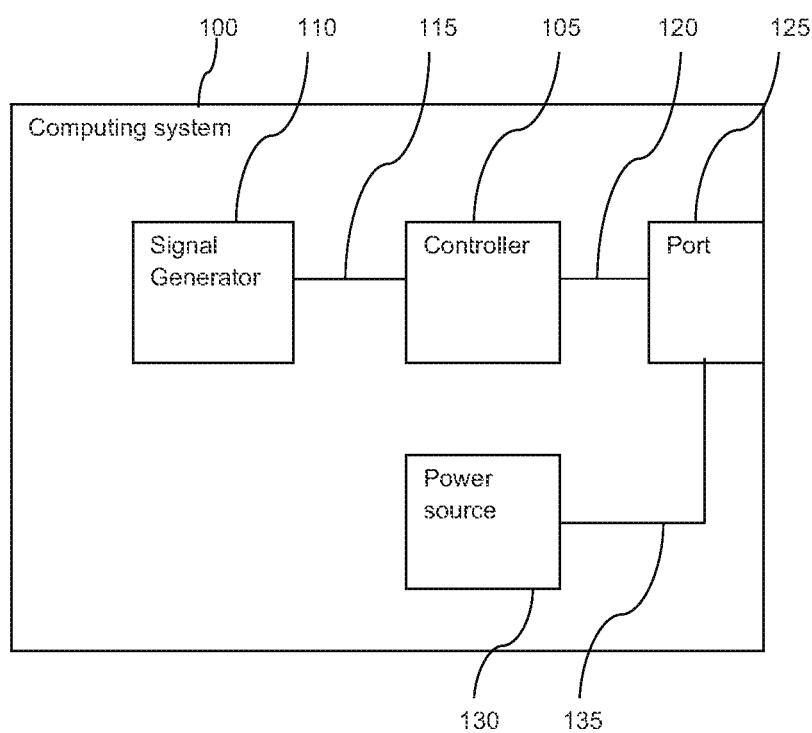
FIG. 1 is a block diagram according to an example embodiment of a computing system.

A portable electronic device can be a device with a rechargeable battery. For example a portable electronic device can be a cell phone, portable music player, a camera, or another device. A portable electronic device may include a data connection port that allows digital data to be transferred from or to the portable electronic device. The data connection port may also have terminals for receiving power through the data connection port. The power received from the data connection port may be used to charge the battery or power the portable device. The data connection port may be a universal serial bus (USB) port or another data connection port that supplies power to a connected portable electronic device when connected to the data connection port.

A battery, for example a lithium ion or lithium polymer battery may charge at a different rate depending on the amount of current available to the battery charging circuit. Current is the flow of charge through the conductor. The charge is in the form of electrons that move through the conductor. The battery stores the electrons when it is charging and supplies the electrons to a load when the portable electronic device is operating. Increasing the current flow available to the battery can decrease the time that is used to charge a battery. For example if the current drawn to charge the battery is 1.5 amps then the battery may charge in less time than if the current drawn to charge the battery is 0.5 amps.

A Battery Charging Specification (BCS) for USB can define charging protocols. For example the Battery Charging Specification, Revision 1.1 from the USB implementers forum includes references to a dedicated charging port (DCP) and a charging downstream port (CDP). The DCP and CDP can allow a device to connect to a USB port and charge at a rate that is above the standard USB charging rate.

A Standard Downstream Port can be a downstream port on a computing system that expects a downstream device to draw less than 2.5 mA average when unconnected or suspended, up to 100 mA maximum when connected and not suspended, and up to 500 mA maximum if so configured and not suspended. A Standard Downstream Port pulls the data lines, for example the D+ and D− lines, to ground through a 15 kOhm resistor. A Standard Downstream port may have the ability to sense if a Portable Device is driving the D+ line and react in some way, such as wake the computing system.

A Charging Downstream Port is a downstream port on a device that is required to support the Charging Downstream Port features of the Battery Charging Specification. A Charging Downstream Port is capable of outputting a current of, for example 1.5 amps at any time.

According to the Battery Charging Specification, a Dedicated Charging Port is a downstream port on a device that outputs power through a USB connector, but is not capable of enumerating a downstream device. A Dedicated Charging Port is required to output at a minimum current, for example 1.5 amps. A Dedicated Charging Port is required to short the data lines, for example D+ line to the D− line.

The standards are not compatible with the power management states of a computer system. For example a protocol such as CDP requires the presence of a USB host and if a computer is in an off state, for example in the S5, off state, of the advanced configuration and power interface (ACPI) standard, there is not a USB host. If a portable device was connected to a computer with CDP but was in the off state the portable electronic device battery may not charge at the above standard rate as it would expect to be communicating with a USB host. The DCP protocol may connect two signal terminals together to indicate that the port is a DCP. If signal terminals are connected together data cannot be transmitted over the signal terminals and therefore data cannot be transferred between the computer and the portable electronic device.

In one embodiment a computing system can include a port to communicate data and to provide power to a portable device. A power source can provide a current to the portable device. A signal generator can provide a signal indicating the power state of the computing system. A controller can receive the signal and determine the type of charging port for the portable device based on the power state of the computing system.

With reference to the figures, FIG. 1 is a block diagram according to an example embodiment of a computing system. The computing system 100 can include a signal generator 110 connected to a controller 105 through first connection 115. The controller 105 can be connected to a port 125 through second connection 120. A power source 130 can be connected to the port 125 through third connection 135.

The port 125 can communicate data with and provide power to a portable device. The port 125 may be for example a USB port or another port that provides both communication and power to a portable device.

The power source can provide a current to the port 125 to supply to a portable device that is connected to the port 125. The power source may provide a constant current to the port or may provide different current levels. For example the power source may provide a constant 1.5 amps allowing a portable device to draw anything up to 1.5 amps and the power source can supply the current drawn by the portable device. The amount drawn by the portable device may be determined by the portable device after a handshake. In another example the power source may be off and not supply any current to the port or may have a reduced amount of current provided such as 0.5 amps.

The signal generator 110 may be part of a controller hub. A controller hub can be for example a computer system chipset which may include multiple input/output controllers for communication with memory, graphics processing, network communication or other input/output. The signal generator 110 can provide a signal indicating the power state of the computing system. The power state of the system may be for example S5, an off state, S3, a low power state, S0, an operational state according to ACPI.

The controller 105 can receive a signal from the signal generator 110 indicating the power state of the computing system 100 and determine the type of charging port for the portable device based on the power state of the computing system. In one embodiment if the power supply is in an off state as indicated by the signal communicated by the connection 115 then the type of charging port determined by the controller 105 may be a dedicated charging port (DCP). The dedicated charging port does not use a USB host and therefore the computer does not have to be an operational USB host and can allow a portable electronic device to draw more current from the port 125 than would be allowed if the type of port 125 was a standard USB port.

In one embodiment if the power supply is in an operational state indicated by the signal communicated by the connection 115 then the type of charging port may be a charging downstream port (CDP). The charging downstream port (CDP) requires a USB host and also allows data to be transferred by the port.

Figure 2:
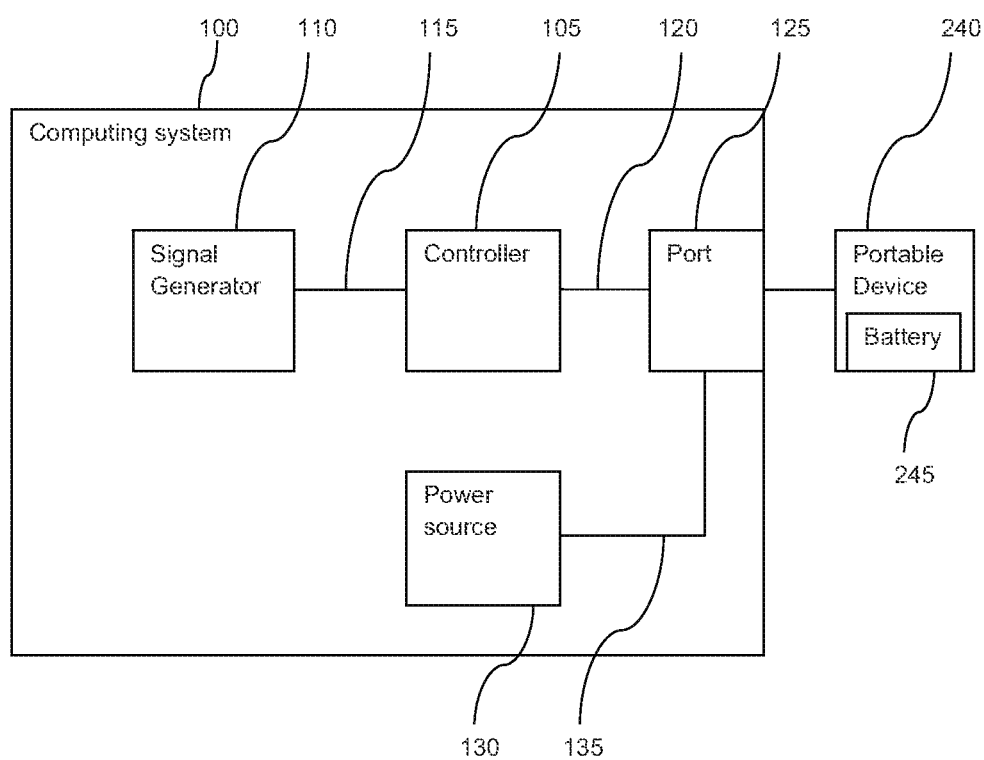
FIG. 2 is a block diagram according to an example embodiment of a computing system.

FIG. 2 is a block diagram according to an example embodiment of a computing system. The port 125 can be connected to the portable device 240. The portable device 240 can include a battery 245. The battery 245 can be charged by receiving power from the port 125. The port 125 can receive power from the power source 130.

In one embodiment the power source 130 is capable of supplying an amount of current at least equal to the most that can be drawn by the portable device 240. For example the power source 130 may be able to supply 1.5 amps to the portable device 240 to charge the battery 245. In one embodiment it is the portable device 240 that determines how much current can be drawn from the port 125. To determine the amount of current the portable device 240 draws from the port 125 the device may perform a handshake. A handshake can be for example a signal from the controller that is received by the portable device. If the controller 105 provides a handshake that is completed with the portable device 240 the portable device 240 can draw an increased amount of current than if the handshake is not completed. In one embodiment the current supplied by the power source 130 increases if the controller 105 completes the handshake because the portable device 240 is drawing the additional power from the power source 130.

In a low power state the port 125 can be a dedicated charging port if a handshake is completed with the portable device 240. In one embodiment the portable device 240 may determine that the port 125 is a dedicated charging port signal lines of the port are shorted together if the port is a dedicated charging port.

A computing system that is in a low power state may receive a signal from the portable device 240 through the port that wakes the computing system 100 from a low power state. If the computing system is woken from the low power state the port 125 cannot be a dedicated charging port (DCP). A computing system 100 that is in an operation state after waking can have a port 125 that is a charging downstream port if a handshake is completed. A computer system 100 that is connected to a portable device 240 through a charging downstream port can communicate data with the portable device through the port 125 if the port 125 is a charging downstream port.

Figure 3:
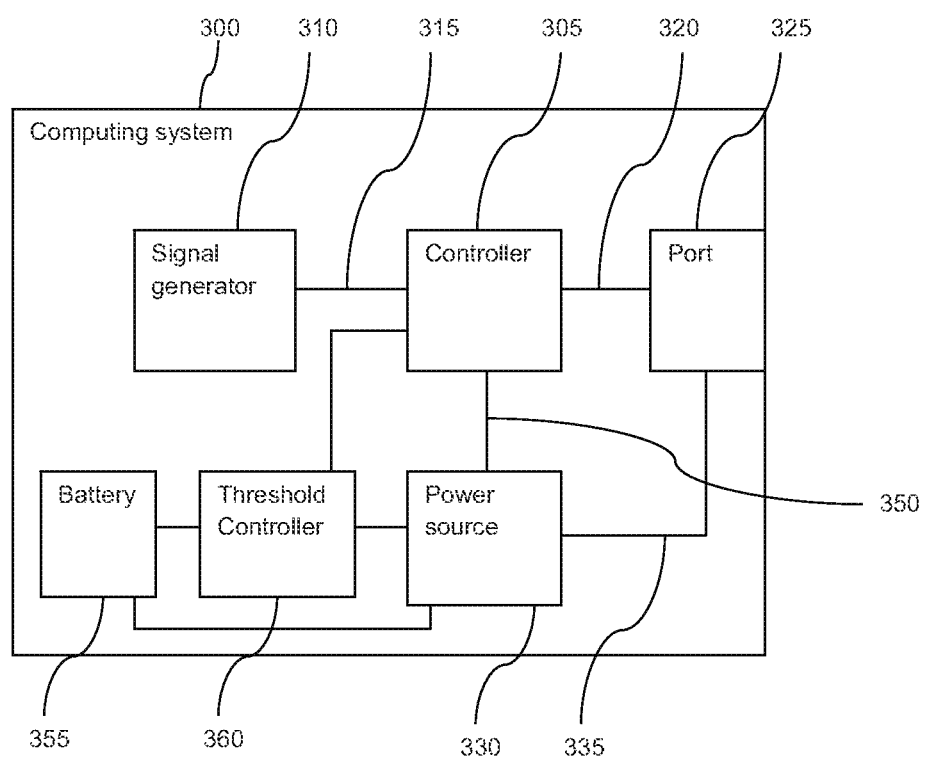
FIG. 3 is a block diagram according to an example embodiment of a computing system.

FIG. 3 is a block diagram according to an example embodiment of a computing system. A computing system 300 can include a battery 355. The battery 355 can provide power to the computing system 300 and may provide power to the power source 330. The computing system 300 can include a signal generator 310 to generate a signal that indicates the power state of the computing system 300. The signal can be received by the controller 305 through connection 315. If a computing system is in a low power state the controller 305 may designate the port 325 a dedicated charging port. The computing system 300 can include a threshold controller 360 to disable the dedicated charging port if the battery capacity is below a threshold. A threshold may be user define, preprogrammed or dynamic. In an example if the threshold is 20 percent of the battery capacity and the battery charge drops to 20 percent of the battery capacity the threshold controller 360 disables the dedicated charging port. If the dedicated charging port is disabled, the power source may not supply any power to the port 325 through connection 335 or the controller 305 may not provide the hand shake to the port 325 through connection 320. If the controller 305 does not provide the hand shake to the port, the portable device can revert to a standard USB port mode and draw current based on the standard USB mode, for example 0.5 amps.

If the computing system is in an operational state as indicated by the signal generator 310 to the controller 305 then the controller 305 may designate the port 325 a charging down steam port. If the port is a charging downstream port the threshold controller 360 can be used to determine if the battery charge is below a threshold and disable the charging downstream port by indicating to the controller 305 not to provide the handshake to the port 325.

Figure 4:
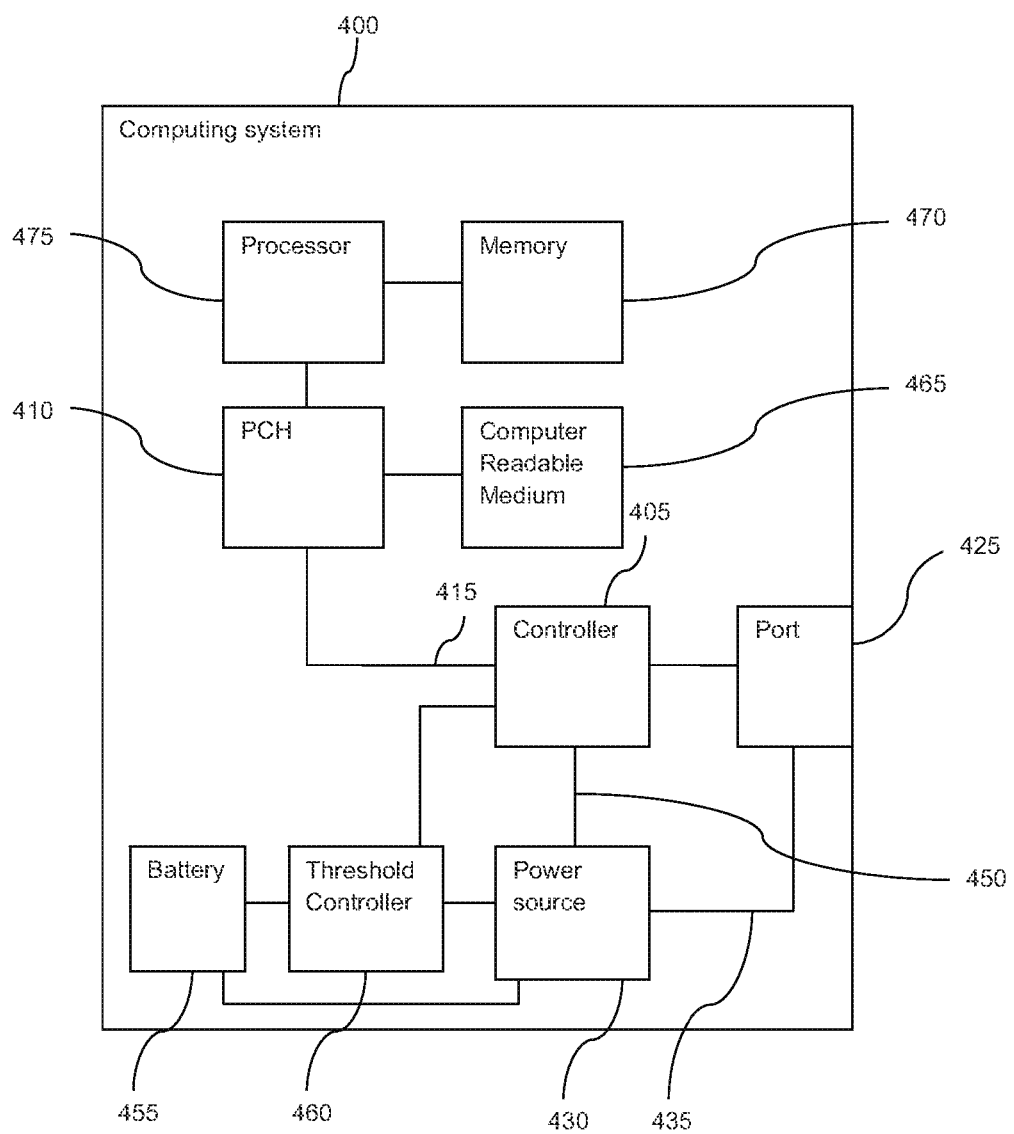
FIG. 4 is a block diagram according to an example embodiment of a computing system.

FIG. 4 is a block diagram according to an example embodiment of a computing system. The computing system 400 can include a processor 475 connected to a memory 470. The memory may be a non-volatile memory that provides storage for the basic input/output system instructions (BIOS). The instructions in the BIOS may be user controllable and may be used to determine if the port 425 can become a dedicated charging port if the system is in a low power or off state. The processor may be connected to the peripheral controller hub 410. The peripheral controller hub 410 may include a signal generator to indicate the power state of the computing system 400 to the controller 405 through connection 415.

The peripheral controller hub 410 may connect to a computer readable medium 465. The computer readable medium may be a non-volatile memory or a volatile memory. For example the computer readable medium may be a hard drive or random access memory (RAM). The computer readable medium may include instructions that if executed by the processor cause the computing system 400 determine a power state of the computing system using the peripheral controller hub 410. The instructions can cause the system provide a port 425 that is a dedicated charging port if the computing system 400 is in a low power state and a charging downstream port if the computing system 400 is in an operational state.

The computing system 400 may include a battery 455. A threshold controller 460 may monitor the battery 455 and determine if the battery charge is below a threshold of battery capacity. The threshold controller 460 may control the output of the power source 430 or the controller 405.

Figure 5:
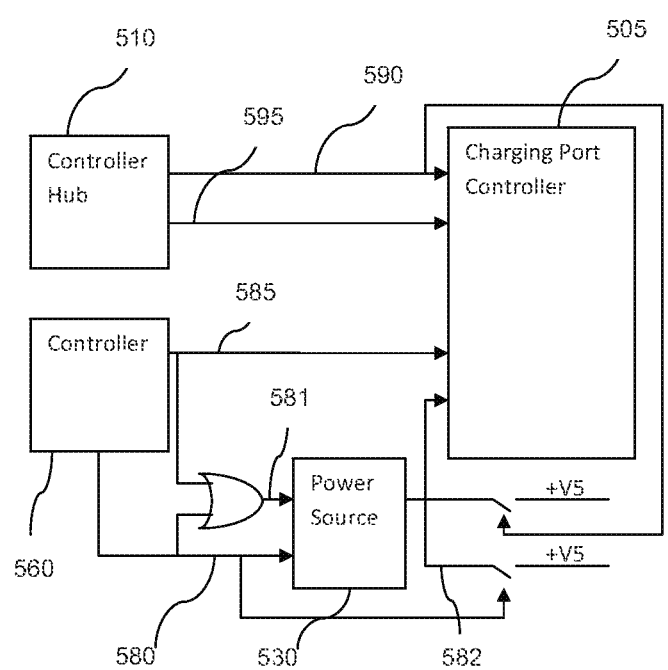
FIG. 5 is a schematic diagram according to an example embodiment.

FIG. 5 is a schematic diagram according to an example embodiment. In one embodiment the controller hub 510 can supply at least one signal to the charging port controller 505. For example the controller hub 510 can supply a first signal and a second signal. For example the first signal 590 may be SLP_S3# and the second signal 595 may be SLP_S4# according to ACPI. The charging port controller 505 can receive the signals at inputs CTL1 and CTL2. For example if the first signal 590 is logic 0 and the second signal 595 signal is logic 0 then the system is in S5 or off state, if the first signal 590 is logic 0 and the second signal 595 signal is logic 1 then the system is in S3 or sleep state and if the first signal 590 is logic 1 and the second signal 595 signal is logic 1 then the system is in S0 or operational state.

A controller 560 may supply a third signal 585 to the charging port controller 505 received at input CTL3. The controller 560 may be for example a keyboard controller. The third signal 585 may be activated by the BIOS to indicate to the charging port controller 505 to enable supply of a dedicated charging port or a charging downstream port in a static mode based on the system power state. In a dynamic mode the third signal 585 may be de-asserted if the battery of the computing system is determined to be below a threshold. For example if the system is in an operational state the third signal 585 may be de-asserted if the battery charge is at a critical battery level such as 5 percent of battery capacity. Another example is if the system is in a low power state the third signal 585 is de-asserted if the battery is below a user defined threshold or below a critical threshold and can be re-asserted if the computing system is connected to an external source or the battery goes above the threshold.

The controller_PWR_ON signal 580 can be received by the power source 530. The power source 530 determines from the controller_PWR_ON signal 580 and the V5CP_EN signal 581 whether to output power at +V5CP at 582.

FIG. 6 is a table of logic values according to an example embodiment. If the third signal 585 is logic 0, first signal 590 is logic 0 and second signal 595 is logic 0 the Charging Port mode is off and the System is in S5 with V5CP forced on via controller_PWR_ON signal 580. Third signal 585 may be asserted from this mode in the case where computing system transitions from battery to AC power.

If the third signal 585 is logic 1, first signal 590 is logic 0 and second signal 595 is logic 0 the Charging Port mode is DCP and System in S5 with V5CP turned on by third signal 585. Charging Port is enabled and charging port controller 505 is in DCP mode. Third signal 585 can be de-asserted during this mode if running from Battery and Controller 560 determines battery is below user defined setting. Controller 560 may optionally de-assert third signal 585 if a critical battery situation is deemed necessary, which would terminate any BCS charge session in process and force the charging port OFF.

If the third signal 585 is logic 0, first signal 590 is logic 0 and second signal 595 is logic 1 the Charging Port mode is SDP and System in S3. Charging Port is enabled, but third signal 585 is indicating that Charging Mode is disabled. Third signal 585 may be asserted from this mode in the case where the computing system transitions from battery to AC.

If the third signal 585 is logic 1, first signal 590 is logic 0 and second signal 595 is logic 1 the Charging Port mode is DCP and the System in S3. Charging Port is enabled, and third signal 585 is indicating that Charging Mode is enabled. Third signal 585 can be de-asserted during this mode if running from Battery and Controller 560 determines battery is below user defined setting. Controller 560 may optionally de-assert third signal 585 if a critical battery situation is deemed necessary, which would terminate any BCS charge session in process and force the port into SDP mode.

If the third signal 585 is logic 0, first signal 590 is logic 1 and second signal 595 is logic 1 the Charging Port mode is SDP and the System in S0. The Controller 560 should set the state of third signal 585 according to user setting received. The third signal 585 never changes state in this case.

If the third signal 585 is logic 1, first signal 590 is logic 1 and second signal 595 is logic 1 the Charging Port mode is CDP and the System in S0. The Controller 560 should set the state of third signal 585 according to user setting received, but ignore user defined threshold (for S0 state). Controller 560 may optionally de-assert third signal 585 if a critical battery situation if deemed necessary, which would terminate any BCS charge session in process and force the port into SDP mode.

Figure 7:
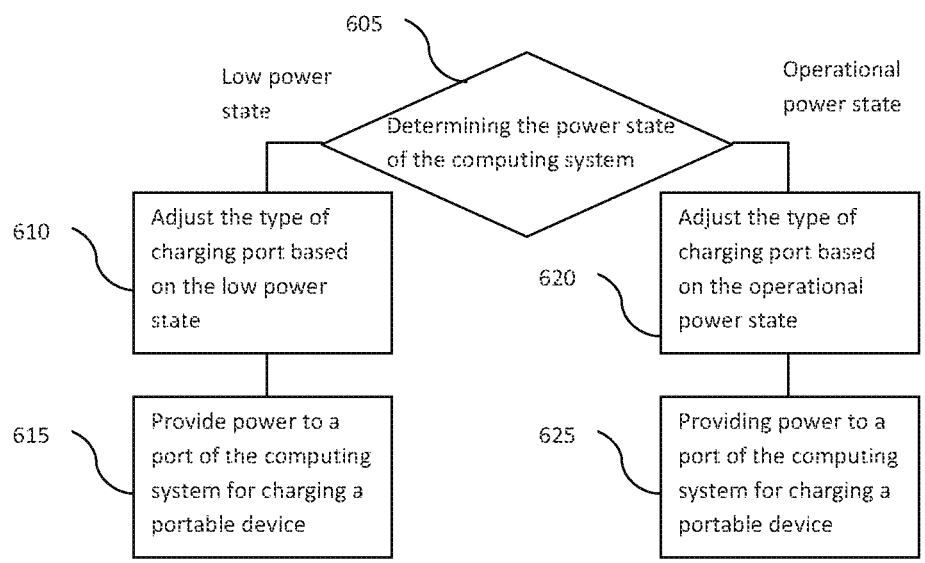
FIG. 7 is a flow diagram of a method according to an example embodiment.

FIG. 7 is a flow diagram of a method according to an example embodiment. The method can charge a portable device from a computing system. The method may determine the power state of the computing system at 605. If the power state of the computing system is in an operational power state the method proceeds to adjusting the type of charging port based on the operational power state of the system at 620. The type of charging port can be determined by a controller, for example based on the operational state of the computing system the controller may designate the port either a charging downstream port or a standard downstream port. After the type of charging port is designated power can be supplied to the port for the computing system at 625 for charging a portable device. Alternatively the power is always provided to the port and the controller changes the handshake with the portable device to indicate to the portable device available power.

If it is determined that the power state of the computing system at 605 is in a low power state then the type of charging port is based on the low power state of the computing system at 610. A low power state may be an S3 sleep state or may be an S5 off state. The charging port mode may be the same in the sleep state and off state or may be different. For example the in the off state the charging port may be off or in DCP while in the sleep state the charging port may be in the SDP or the DCP mode. After the type of charging port is determined power can be supplied to the port for the computing system at 615 for charging a portable device.

The method may also include determining a battery threshold and changing the type of charging port or disabling the Dedicated Charging port and the Charging Downstream Port if it is determined that the battery charge is beyond a threshold. For example if the battery threshold capacity is set at 20 percent and the battery charge drops below 20 percent of the battery capacity the type of charging port may be changed. After the type of port is determined at 610 or 620 a handshake protocol is determined for indicating to the portable device the amount of power available.

The techniques described may be embodied in a computer-readable medium for configuring a computing system to execute the method. The computer readable media may include, for example and without limitation, any number of the following; magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing system comprising:
    a port to communicate data and to provide power to a portable device;
    a power source to provide a current to the portable device;
    a signal generator to provide a signal indicating a power state of the computing system; and
    a controller to receive the signal and determine a type of charging port for the portable device based on the signal indicating the power state of the computing system when the computing system is in a low power state.

2. The system of claim 1, wherein the controller provides a handshake that if completed with the portable device the portable device can draw an increased amount of current than if the handshake is not completed.

3. The system of claim 2, wherein the current supplied by the power source increases if the controller completes the handshake.

4. The system of claim 1, wherein the port is identified as a dedicated charging port by the portable device if a handshake is completed with the portable device and the signal indicates a low power state.

5. The system of claim 4, wherein signal lines and power lines of the port are configured in a manner that the portable device recognizes the port as a dedicated charging port.

6. The system of claim 1, wherein if the port is configured to allow the portable device connected to the port to wake the computing system from a low power state the port cannot be a dedicated charging port.

7. The system of claim 1, wherein the port is identified as a charging downstream port by the portable device if a handshake is completed and the computing system is in a working power state.

8. The system of claim 7, wherein the computing system communicates data with the portable device through the port if the port is a charging downstream port.

9. The system of claim 1, further comprising a battery threshold controller to disable handshake for at least one of the dedicated charging port or the charging downstream port when the battery capacity is below a threshold.

10. A method of charging a portable device from a computing system:
    determining a power state of the computing system;
    generating a signal indicating the power state of the computing system;
    providing power to a port of the computing system for charging a-n-a portable device; and
    adjusting a type of power charging port based on the signal indicating the power state of the computing system when the computing system is in a low power state.

11. The method of claim 10, wherein the type of power charging port is selected from at least a dedicated charging port, a charging downstream port and a standard downstream port.

12. The method of claim 11, further comprising selecting a battery threshold and disabling the dedicated charging port or the charging downstream Port handshake protocols.

13. The method of claim 11, further comprising providing a handshake protocol for communication with a portable device.

14. The method of claim 10, further comprising a first type of power charging port wherein data is communicated from the port to a portable device and a second type of power charging port wherein a configuration of a data line of the port prevents a handshake.

15. A non-transitory computer readable medium comprising code that if executed causes a computing system to:
    determine a power state of the computing system;
    generate a signal indicating the power state of the computing system;
    provide power to a port of the computing system for charging a portable device; and
    adjust a type of power charging port based on the power state of the computing system when the computing system is in a low power state.

16. The non-transitory computer readable medium of claim 15, wherein the type of power charging port is selected from at least a dedicated charging port, a charging downstream port or a standard downstream port.

17. The non-transitory computer readable medium of claim 16, wherein the code if executed causes the computing system to:
    select a battery threshold and disable the dedicated charging port or the charging downstream port handshake protocols.

18. The non-transitory computer readable medium of claim 16, wherein the code if executed further causes the computing system to:
    provide a handshake protocol for communication with a portable device.

* * * * *

UNITED STATES PATENT AND TRADEMARK OFFICE
CERTIFICATE OF CORRECTION

| | |
|---|---|
| PATENT NO. | : 9,197,075 B2 |
| APPLICATION NO. | : 13/819333 |
| DATED | : November 24, 2015 |
| INVENTOR(S) | : Jeffrey Kevin Jeansonne et al. |

It is certified that error appears in the above-identified patent and that said Letters Patent is hereby corrected as shown below:

In the claims,

In column 8, line 7 approx., in Claim 10, delete "a-n-a" and insert -- a --, therefor.

In column 8, line 18 approx., in Claim 12, delete "Port" and insert -- port --, therefor.

Signed and Sealed this
Twenty-second Day of March, 2016

Michelle K. Lee
*Director of the United States Patent and Trademark Office*